United States Patent
Booth et al.

(10) Patent No.: US 7,921,336 B1
(45) Date of Patent: Apr. 5, 2011

(54) SYSTEM AND METHOD FOR AVOIDING CATEGORIZING POTENTIAL LINK ERROR EVENTS AS ACTUAL LINK ERROR EVENTS BASED ON A PROXIMITY TO A PHYSICAL LAYER SIGNAL STATE CHANGE

(75) Inventors: Wayne Booth, San Jose, CA (US); Feng Wang, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 390 days.

(21) Appl. No.: 12/038,413

(22) Filed: Feb. 27, 2008

(51) Int. Cl.
*G06F 11/00* (2006.01)
(52) U.S. Cl. ........................................ 714/48
(58) Field of Classification Search ............ 714/48
See application file for complete search history.

(56) References Cited

U.S. PATENT DOCUMENTS

| | | | | |
|---|---|---|---|---|
| 5,023,872 A | * | 6/1991 | Annamalai | 714/704 |
| 6,252,417 B1 | * | 6/2001 | Adams et al. | 326/16 |
| 2004/0199834 A1 | * | 10/2004 | Fukae | 714/699 |
| 2008/0005621 A1 | * | 1/2008 | Bedwani et al. | 714/43 |

* cited by examiner

*Primary Examiner* — Scott Baderman
*Assistant Examiner* — Yair Leibovich
(74) *Attorney, Agent, or Firm* — Zilka-Kotab, PC (57) ABSTRACT

A system and method are provided for avoiding categorization of non-error events as actual error events. This is accomplished by categorizing potential error events as actual error events or non-error events based on a proximity to a physical layer signal state change. By this feature, the result of the categorization may be used to more effectively avoid categorizing non-error events and accompanying noise, etc., as actual error events. To this end, in various embodiments, more accurate error counting is afforded to preclude inadvertent disabling, etc. of a mass storage device or associated link that would otherwise result from a flawed error count.

20 Claims, 10 Drawing Sheets

SYSTEM AND METHOD FOR AVOIDING CATEGORIZING POTENTIAL LINK ERROR EVENTS AS ACTUAL LINK ERROR EVENTS BASED ON A PROXIMITY TO A PHYSICAL LAYER SIGNAL STATE CHANGE

FIELD OF THE INVENTION

The present invention relates to storage systems, and more particularly to managing error events in storage systems.

BACKGROUND

A storage server is a special purpose processing system used to store and retrieve data on behalf of one or more clients. A storage server operates on behalf of one or more clients to store and manage shared files in a set of mass storage devices, such as magnetic or optical storage-based disks or tapes. In use, the foregoing mass storage devices are monitored for error events, in order to manage a health of the system, etc. Typically, these error events are counted over a predetermined time such that, if they surpass a predetermined error rate threshold, appropriate action may be taken. For example, a mass storage device or associated link that exhibits a predetermined number of error events within a predetermined time period may be disabled, disconnected, or otherwise taken out of service, etc.

One example of such error counting technique is that used by the small computer system interface (SAS) expander technology developed by Network Appliance, Inc., of Sunnyvale, Calif. Various challenges associated with such error counting technique arise when events that are not necessarily error events are counted as such. These events sometimes involve a situation where a mass storage device is intentionally reset (i.e. shut down and restarted), for instance. In such situation, it is possible that such reset event may propagate to an error counting mechanism with some level of noise. Such noise may result from a signal representing such reset event being degraded, inflicted with undesired perturbations, etc. If such noise reaches a certain threshold, the reset event may inadvertently be counted as an error event. Thus, in cases where a sufficient number of such non-error events are counted as actual error events, the mass storage device or associated link may inappropriately be disabled, disconnected, or otherwise taken out of service, etc.

There is thus a need for addressing problems associated with the prior art.

SUMMARY

A system and method are provided for avoiding categorization of non-error events as actual error events. This is accomplished by categorizing potential error events as actual error events or non-error events, based on a proximity to a physical layer signal state change (e.g. a change in the physical layer signal from, for example, a first value to a second value, or visa versa). By this feature, the result of the categorization may be used to more effectively avoid categorizing non-error events and accompanying noise, etc., as actual error events. Such noise may result from a signal representing such non-error event being degraded, inflicted with undesired perturbations, etc. To this end, in various embodiments, more accurate error counting is afforded to preclude inadvertent disabling of a mass storage device or associated link that would otherwise result from a flawed error count.

Using the foregoing technique, situations may be avoided where storage devices are returned, either because they are disabled based on mistaken error counts or due to mistaken error counters seen directly by the user. Thus, by using the above-mentioned technique to ensure more accurate error counts, an enterprise may reduce the number of allegedly failed storage devices that are returned. In addition to lowering the support costs for the product, customer perception may also be improved.

In one example of use according to one embodiment, a potential error event is identified in association with a storage device and/or a link to a storage device. In addition, a physical layer signal state change is identified, as well. It may then be determined whether the potential error event occurred within a predetermined time of the physical layer signal state change. If it is determined that the potential error event occurred within the predetermined time of the physical layer signal state change, the potential error event is categorized as a non-error event. On the other hand, if it is determined that the potential error event did not occur within the predetermined time of the physical layer signal state change, the potential error event is categorized as an actual error event. To this end, a result of the categorization may be outputted.

In different embodiments, such result may take various forms. In some embodiments, the result may be passive in nature. Just by way of example, the result may involve simply reporting the result of the categorization. In other embodiments, the result may be more active in nature. For instance, non-error events may be filtered and/or actual error events may only be counted.

In various embodiments, the storage device may take various forms including, but not limited to a serial advanced technology attachment (SATA) storage device, a serial attached small computer system interface (SAS) storage device, etc.

DETAILED DESCRIPTION

A system and method are provided for avoiding categorization of non-error events as actual error events. This is accomplished by categorizing potential error events as actual error events or non-error events, based on a proximity to a physical layer signal state change. In particular, potential error events that are identified within a predetermined proximity of a physical layer signal state change may be filtered, in order to avoid categorizing noisy non-error event as actual error events.

In use, a potential error event is identified in association with a storage device and/or a link to a storage device. Further, it may then be determined whether the potential error event occurred within a predetermined time of a physical layer signal state change. If it is determined that the potential error event occurred within the predetermined time of the physical layer signal state change, the potential error event is categorized as a non-error event. On the other hand, if it is determined that the potential error event did not occur within the predetermined time of the physical layer signal state change, the potential error event is categorized as an actual error event.

By this feature, the result of the categorization may be used to more effectively avoid categorizing non-error events and accompanying noise, etc., as actual error events. To this end, in various embodiments, more accurate error counting is provided which, in turn, contributes to preventing a mass storage device or associated link from being inappropriately disabled, etc. More information will now be set forth regarding the underlying features with which the foregoing technique is made possible, according to various embodiments.

Figure 1:
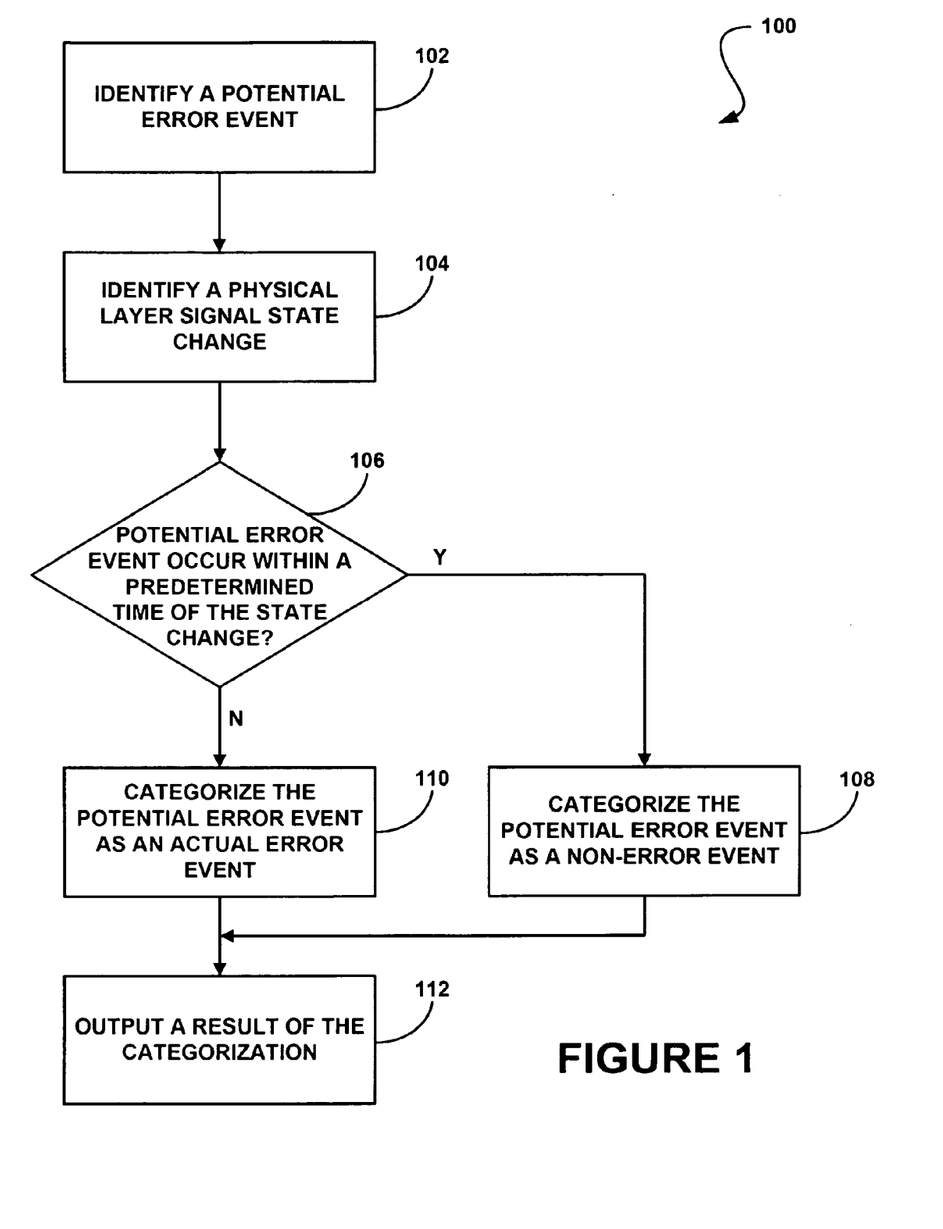
FIG. 1 illustrates a method for avoiding categorization of non-error events as actual error events, in accordance with one embodiment.

FIG. 1 illustrates a method 100 for avoiding categorization of non-error events as actual error events, in accordance with one embodiment. As shown, a potential error event is identified in association with a storage device and/or a link to a storage device. See operation 102. In the context of the present description, such potential error event may include any event that at least potentially may be categorized as an error, either properly or mistakenly. For example, such potential error event may include an actual error event, or a non-error event in the form of a reset event (e.g. a link reset, adapter reset, hardware reset, hardware power cycle, etc.). In use, the aforementioned non-error event may be potentially mistaken as an actual error event due to noise that may accompany the non-error event. In the case of an actual error event, such error event is one that actually occurred.

In one embodiment, the potential error event may relate to a communication link between two devices. For example, such devices may include a storage device and an associated accessing device, etc. In such embodiment, the potential error event may take the form of a link error event.

In the present description, the storage device may include any hardware capable of storing data. For example, the storage device may, in one embodiment, include one or more mechanical hard drives. In various embodiments, the storage device may take various forms including, but not limited to a serial advanced technology attachment (SATA) storage device, a serial attached small computer system interface (SAS) storage device, etc.

With continuing reference to FIG. 1, a physical layer signal state change is also identified. See operation 104. In the context of the present description, such physical layer signal state change may include any change in a state of a physical layer signal. Further, such physical layer signal may include any signal that resides within a layer of a communication framework that is allocated for one or more physical devices (e.g. storage devices, etc.). For example, in one embodiment, the state change on the physical layer signal may take the form of a change from ready to not ready, or vice versa.

As an option, the physical layer signal state change may be specific to a single particular "PHY." Such PHY includes a transceiver that electrically interfaces with a physical link and/or storage device, as well as the portions of a protocol that encodes data and manages reset sequences, etc. Each PHY that resides in a device [e.g. storage device, expander, SAS host bus adapter (HBA), a driver, etc.] that has a PHY identifier unique to such device.

In one particular embodiment, the physical layer signal state change may specifically involve a change event. As an option, such change event may indicate whether an associated PHY is ready for data transmission. In another possible embodiment, other related physical layer signal state changes may be involved, such as a loss of synchronization signal (e.g. loss of DWORD synchronization, etc.).

Identification of the potential error event and the physical layer signal state change may be carried out in any desired manner. For instance, a mechanism may be used which is capable of detecting such event/signal and optionally storing the same (or information on the same), for reasons that will described in more detail herein. It should be noted that such mechanism may be implemented in hardware and/or software, using any desired technique.

With such information, the potential error event may be more accurately categorized based a proximity thereof to the physical layer signal state change. Specifically, it may be determined whether the potential error event occurred within a predetermined time of the physical layer signal state change. See decision 106. In one embodiment, this may be accomplished by comparing a first timestamp associated with the potential error event and a second timestamp associated with the physical layer signal state change, for determining a difference which may in turn be compared to the aforementioned time period. Such predetermined time may be stored in any desired memory (e.g. expander memory, on or off-board memory, etc.).

It should be noted that such predetermined time period may be selected in any desired manner. For example, it may be manually or automatically selected. In one embodiment, the time period may be selected based on heuristics and/or testing adapted to determine the time period that will best avoid counting non-error events as error events.

If it is determined that the potential error event occurred within the predetermined time of the physical layer signal state change per decision 106, the potential error event is categorized as a non-error event. See operation 108. On the other hand, if it is determined that the potential error event did not occur within the predetermined time of the physical layer signal state change, the potential error event is categorized as an actual event. Note operation 110.

Such categorization may be performed in any desired manner. Just by way of example, in one embodiment, the categorization may be tracked utilizing an accompanying data structure that tracks all of the events. In another embodiment, the categorization may simply track (e.g. count) the actual error events and/or non-error events. For instance, in one possible embodiment, only actual error events may be tracked, while non-error events may simply be discarded or ignored.

To this end, a result of the categorization may be outputted. See operation 112. In different embodiments, such result may take various forms. For instance, such results may be outputted directly to the user and/or reported to another module (e.g. an error counter, etc.) capable of acting on the results in any desired manner.

In some embodiments, the result may be passive in nature. Just by way of example, the result may involve simply reporting the result of the categorization. Such reporting may involve reporting both the actual error events and the non-error events, or just one.

In other embodiments, the result may be more active in nature. For instance, non-error events may be filtered and/or actual error events may only be counted for being tallied and possibly displayed. In another embodiment, the result may effect the disablement of the storage device and/or link to the storage device. Such disablement may take the form of disabling, disconnecting or otherwise taking the storage device and/or link out of service. In still additional embodiments, both passive and active responses may be initiated. For example, while both actual error events and non-error events may be displayed to the user, only actual error events may be used for disablement, etc.

By this design, the result of the categorization may be used to more effectively avoid categorizing non-error events and accompanying noise, etc., as actual error events. To this end, more accurate error counting may thus be provided which, in turn, may prevent a mass storage device or associated link from being inappropriately disabled, and/or mistaken appearance of a low product quality. The alternative to such approach may involve simply ignoring the proximity of the potential error events with respect to the physical layer signal state change, but such would inevitably result in mistakenly counting more non-error events as actual error events due to noise or other factors.

More illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 2:
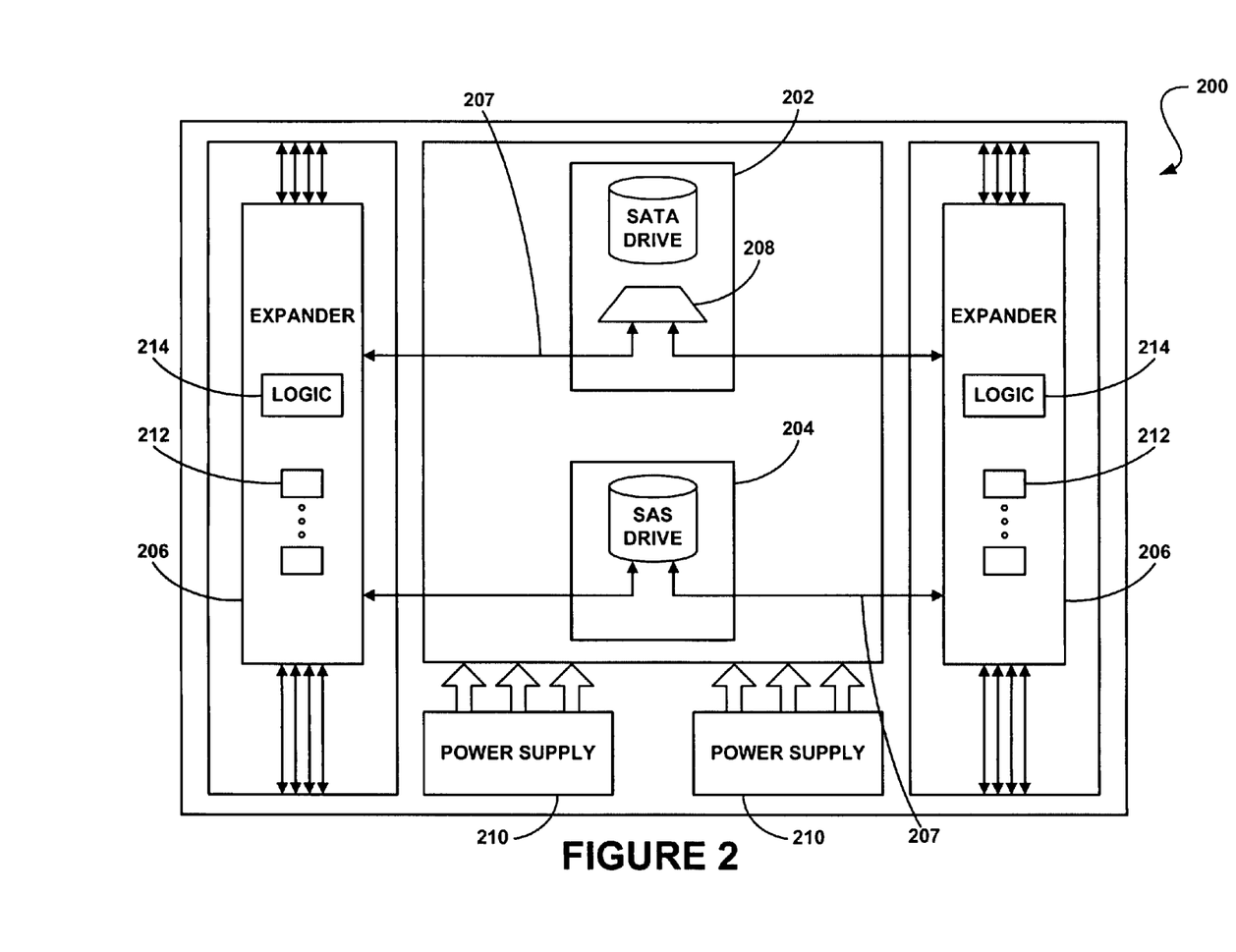
FIG. 2 illustrates a sub-system in which a technique may be used for avoiding categorization of non-error events as actual error events, in accordance another embodiment.

FIG. 2 illustrates a "just a bunch of disks" (JBOD) storage sub-system 200 in which a technique may be used for avoiding categorization of non-error events as actual error events, in accordance another embodiment. As an option, the JBOD storage sub-system 200 may be implemented in the context of the functionality of FIG. 1. Of course, however, the JBOD storage sub-system 200 may be implemented in any desired environment. It should be noted that the definitions provided above equally apply to the present description.

In one embodiment, the JBOD storage sub-system 200 may represent one of multiple "shelves" which each include a plurality of storage devices. As shown, one or more SATA storage devices 202, and/or one or more SAS storage devices 204 may be provided. Such storage devices 202, 204 may, in turn, communicate with a pair of expanders 206 via a plurality of links 207, such that the expanders 206 allow one or more hosts to connect to a larger number of disk devices, like 202 and 204. As an option, the SATA storage devices 202 may communicate with the expanders 206 via a multiplexer 208. For power purposes, a plurality of power supplies 210 may be coupled to the storage devices 202, 204, and the expanders 206.

While two expanders 206 and specific types of storage devices are shown in FIG. 2, it should be noted that other embodiments are contemplated involving a single expander 206 and other types of storage devices. While not shown, the expanders 206 of the JBOD storage sub-system 200 may be daisy-chained or otherwise connected to other sub-systems (not shown) to form an overall storage system. Additional details regarding one possible storage system will be set forth during the description of different embodiments illustrated in subsequent figures.

In use, the expanders 206 may be equipped with one or more hardware counters 212 for counting communication protocol error events propagated by the storage devices 202, 204 via the links 207. To better deal with situations where a non-error event may mistakenly be counted as an error event, the one or more counters 212 of the expanders 206 may be equipped with logic 214 for more intelligently categorizing and counting potential error events in view of noise resulting from various components of the JBOD storage sub-system 200 (e.g. the multiplexer 208, etc.). In one embodiment, such intelligent categorization may be performed in firmware. Of course, however, such logic may be implemented in hardware (e.g. in an ASIC, etc.) or via any other mechanism.

In particular, such logic 214 may serve to determine whether such potential error events fall within a predetermined time of a physical layer signal state change (e.g. PHY change event, etc.) that is also communicated via the links 207. If such potential error events fall within the predetermined time of the physical layer signal state change, such event may not necessarily be counted as an actual error event. To this end, any action taken by the expanders 206 based on the information stored in the counters 212 may be more accurately applied. For example, the expanders 206 may disable one or more of the links 207 when there is a predetermined number of actual error events, without mistakenly counting non-error events as actual error events.

Figure 3:
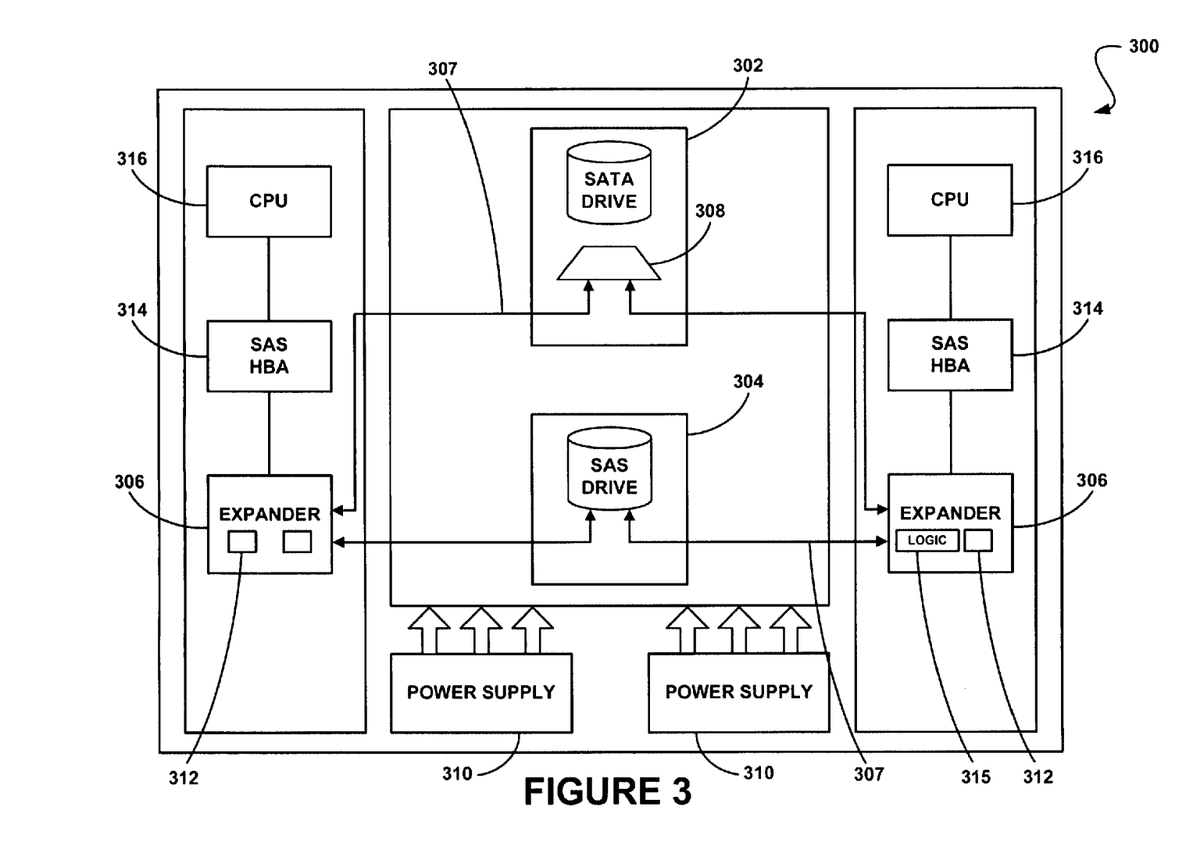
FIG. 3 illustrates another sub-system in which a technique may be used for avoiding categorization of non-error events as actual error events, in accordance with yet another embodiment.

FIG. 3 illustrates a RAID storage sub-system 300 in which a technique may be used for avoiding categorization of non-error events as actual error events, in accordance with yet another embodiment. As an option, the RAID storage sub-system 300 may be implemented in the context of the framework and/or functionality of FIG. 1. Of course, however, it should be noted that the RAID storage sub-system 300 may be implemented in any desired environment. Again, the definitions provided above equally apply to the present description.

Similar to the embodiment of FIG. 2, the RAID storage sub-system 300 of the present figure may include a plurality of storage devices. As shown, one or more SATA storage devices 302, and/or one or more SAS storage devices 304 may be provided. Such storage devices 302, 304 may, in turn, communicate with a pair of expanders 306 via a plurality of links 307. Further, the SATA storage devices 302 may communicate with the expanders 306 via a multiplexer 308.

Unlike the embodiment of FIG. 2, the RAID storage sub-system 300 of the present figure may not necessarily be coupled to other sub-systems. Further, the expanders 306 may be coupled to a dedicated SAS host bus adapter (HBA) 314 which, in turn, is coupled to a central processing unit (CPU) 316. For power purposes, a plurality of power supplies 310 may be coupled to the storage devices 302, 304, the HBA 314, and the CPU 316. Additional details regarding one possible storage system in which the present RAID storage sub-system 300 may be implemented will be set forth during the description of different embodiments illustrated in subsequent figures.

Similar to the embodiment of FIG. 2, the expanders 306 may be equipped with one or more counters 312 for counting error events propagated by the storage devices 302, 304 via the links 307. To better deal with situations where a non-error event may mistakenly be counted as an error event, the one or more counters 312 of the expanders 306 may be accompanied with logic 315 for more intelligently categorizing and counting potential error events. More information regarding various examples of such intelligent categorization of potential error events will now be set forth.

Figure 4:
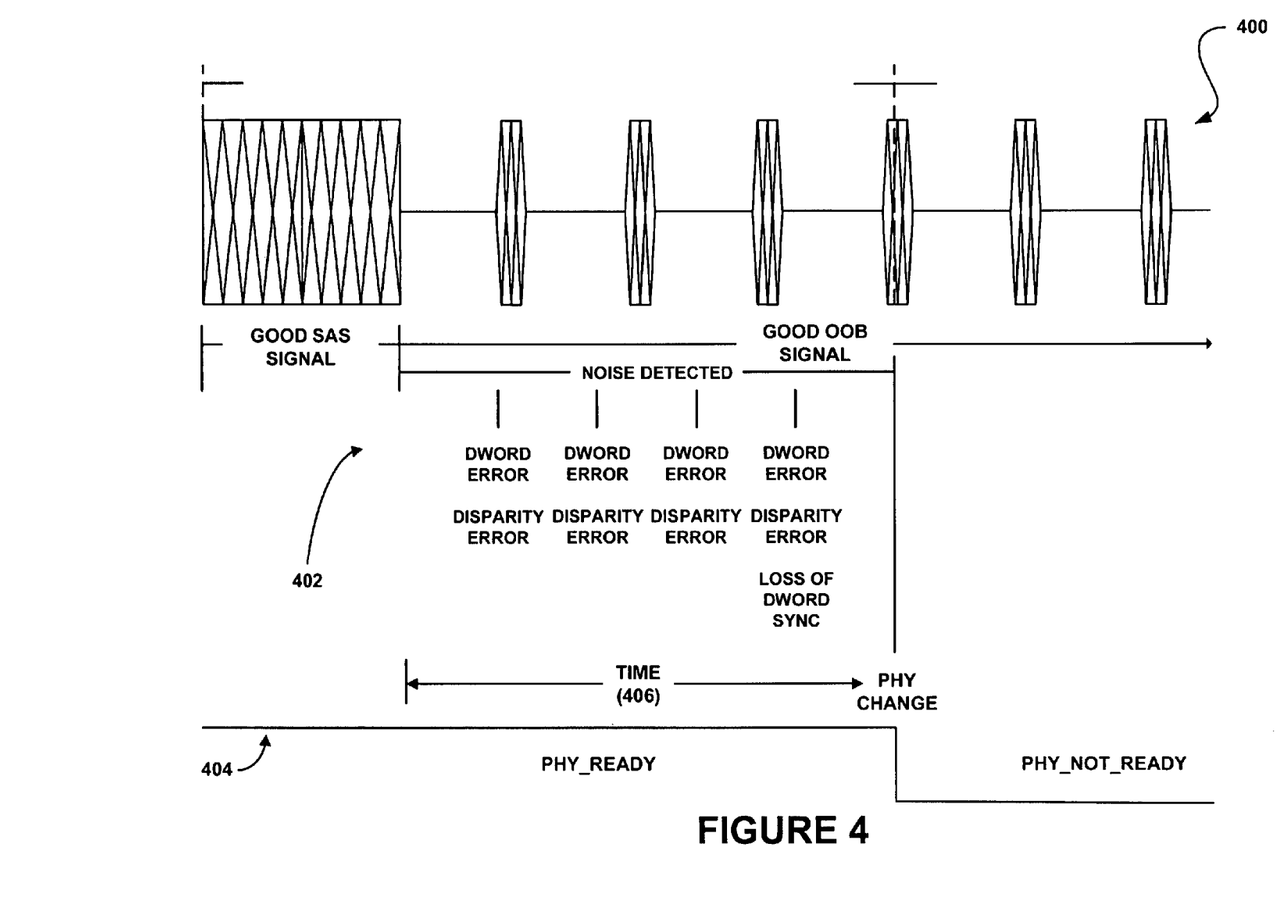
FIG. 4 shows a signal diagram for illustrating the manner in which counting non-error events as actual error events may be avoided, in accordance with another embodiment.

FIG. 4 shows a signal diagram 400 for illustrating the manner in which counting non-error events as actual error events may be avoided, in accordance with another embodiment. In one embodiment, such technique may be carried out by expander logic. See the logic 214, 315 of FIGS. 2-3, for example.

As shown, an initialization sequence signal 402 [e.g. including an out-of-band (OOB) signal, etc.] is unexpectedly received by a PHY which is enabled, as reflected by a PHY_READY state of a state transition signal 404. As set forth earlier, such PHY includes a transceiver that electrically interfaces with a physical link and/or storage device. For example, such PHY may be a component of an expander (e.g. the expanders 206, 306, etc.), and the initialization sequence signal 402 may be received by such PHY from a storage device (e.g. the storage devices 202, 204, 302, 304, etc.).

In use, such initialization sequence 402 may be accompanied by noise, particularly in situations where the initialization sequence signal is propagated via an active multiplexer, etc. In such case, the unexpected OOB signal has the potential of being mistaken for a series of link rate errors followed by a loss of synchronization error (e.g. DWORD error).

For example, the noise may be detected during use, because the OOB sequence is at a significantly lower frequency with respect to the SAS signal. When this happens, the SAS expander hardware loses synchronization and counts errors before transitioning the PHY state from PHY_READY to PHY_NOT_READY. Thus, the unexpected loss of the SAS signal causes errors to be counted before the PHY state is transitioned to PHY_NOT_READY.

To avoid such situation, it may first be determined whether the potential error events (e.g. unexpected OOB signal) occurred within a predetermined time 406 of a change in state of the state transition signal 404. In the present case, it may be found that the potential error events do indeed fall within the predetermined time 406, and may thus not necessarily be counted. It should be noted that the predetermined time 406 is not necessarily drawn to scale, but may, in one embodiment, be actually much larger, since the hardware detects the signal changes in a small number of nanoseconds, while the ability to poll PHY errors and state information may occur on the order of microseconds. As set forth earlier, this functionality may, in one embodiment, be carried out by the expander logic (e.g. logic 214, 315).

Figure 5:
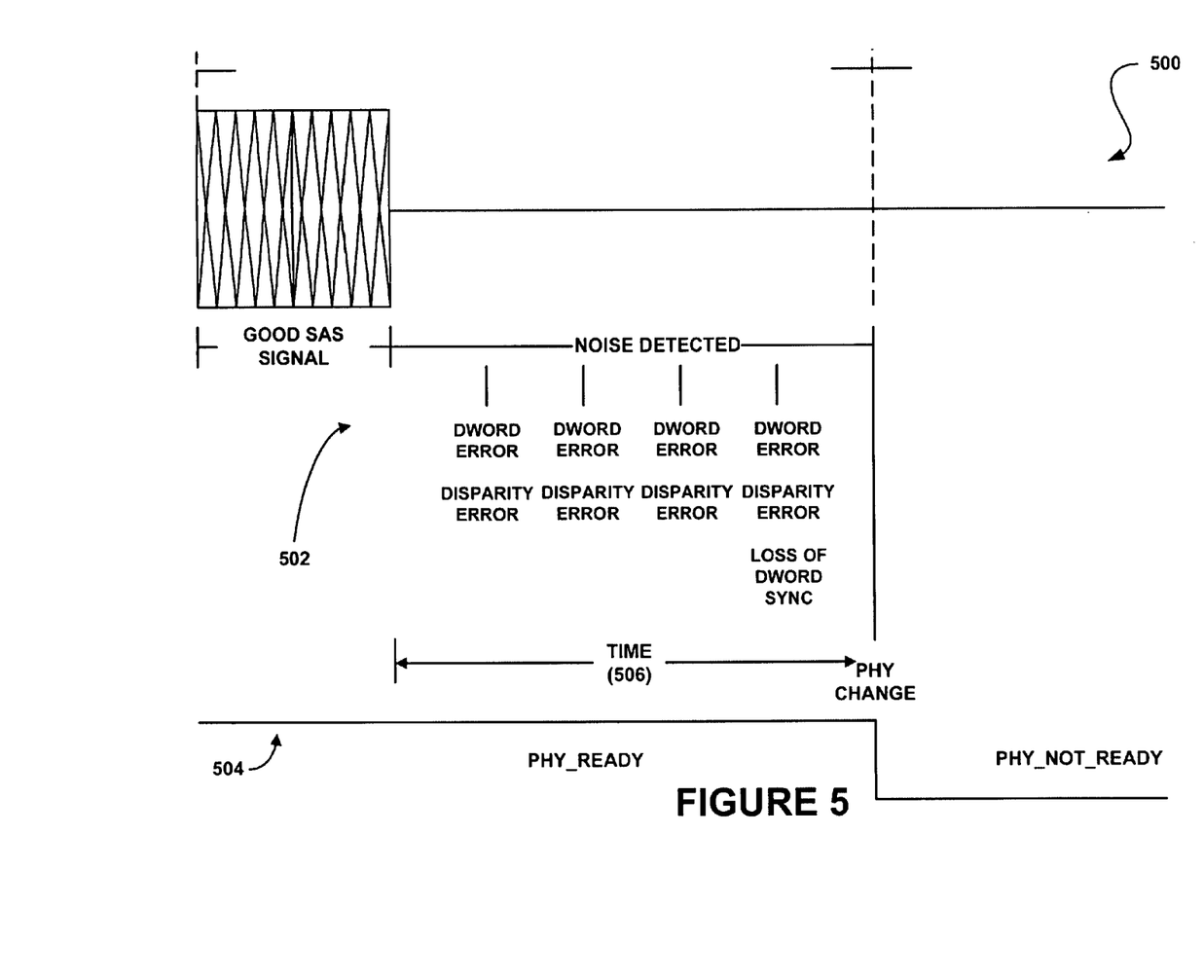
FIG. 5 shows another signal diagram for illustrating the manner in which counting non-error events as actual error events may be avoided, in accordance with yet another embodiment.

FIG. 5 shows another signal diagram 500 for illustrating the manner in which counting non-error events as actual error events may be avoided, in accordance with yet another embodiment. In one embodiment, such technique may be carried out by expander logic. See the logic 214, 315 of FIGS. 2-3, for example.

As shown, an initialization sequence signal 502 being received by an enabled PHY is completely lost. Again, such PHY includes a transceiver (not shown in Figs.) that electrically interfaces with a physical link and/or storage device. For example, such PHY may be a component of an expander (e.g. the expanders 206, 306, etc.), and the initialization sequence signal 502 being received by such PHY from a storage device (e.g. the storage devices 202, 204, 302, 304 302, etc.) may be completely lost.

In the present embodiment, such initialization sequence 502 may simply be dropped. This may happen, for example, when a storage device is power cycled or when an associated adapter is reset. As shown, the initialization sequence 502 may, in such situation, be detected as a series of link rate errors followed by a loss of synchronization error (e.g. DWORD error).

As mentioned previously, the noise may be detected. When this happens, the SAS expander hardware loses synchronization and counts errors before transitioning the PHY state from PHY_READY to PHY_NOT_READY. Thus, the unexpected loss of the SAS signal causes errors to be counted before the PHY state is transitioned to PHY_NOT_READY.

To avoid counting such potential error events as actual error events, it may first be determined whether the potential error events (e.g. link rate errors, etc.) occurred within a predetermined time 506 of a change in state of the state transition signal 504. In the present case, it may be found that the potential error events do indeed fall within the predetermined time 506, and may thus not necessarily be counted. Again, the predetermined time 506 is not necessarily drawn to scale, but may, in one embodiment, be actually much larger, since the hardware detects the signal changes in a small number of nanoseconds, while the ability to poll PHY errors and state information may occur on the order of microseconds.

As exposed in FIGS. 4-5, two issues potentially arise when a "noisy" reset occurs. First, an expander or related hardware may sense the initialization sequence 402, 502 simply drop off completely (see FIG. 5), or go into a much slower OOB sequence (see FIG. 4). In either case, this potentially results in loss of synchronization and/or running disparity errors being counted by hardware-based link rate error counters. Second, a PHY change count hardware register is not necessarily latched at the same time as the line rate error hardware registers.

This, in turn, means that it takes several machine instructions, and thus a number of microseconds, to obtain all of the desired data. With the actual change in state transition signal 404, 504 happening within nanoseconds of the initialization sequence 402, 502 dropping away (and the machine instructions to read the registers taking much longer), it is often difficult to associate line rate errors with a change event in the state transition signal 504.

Figure 6:
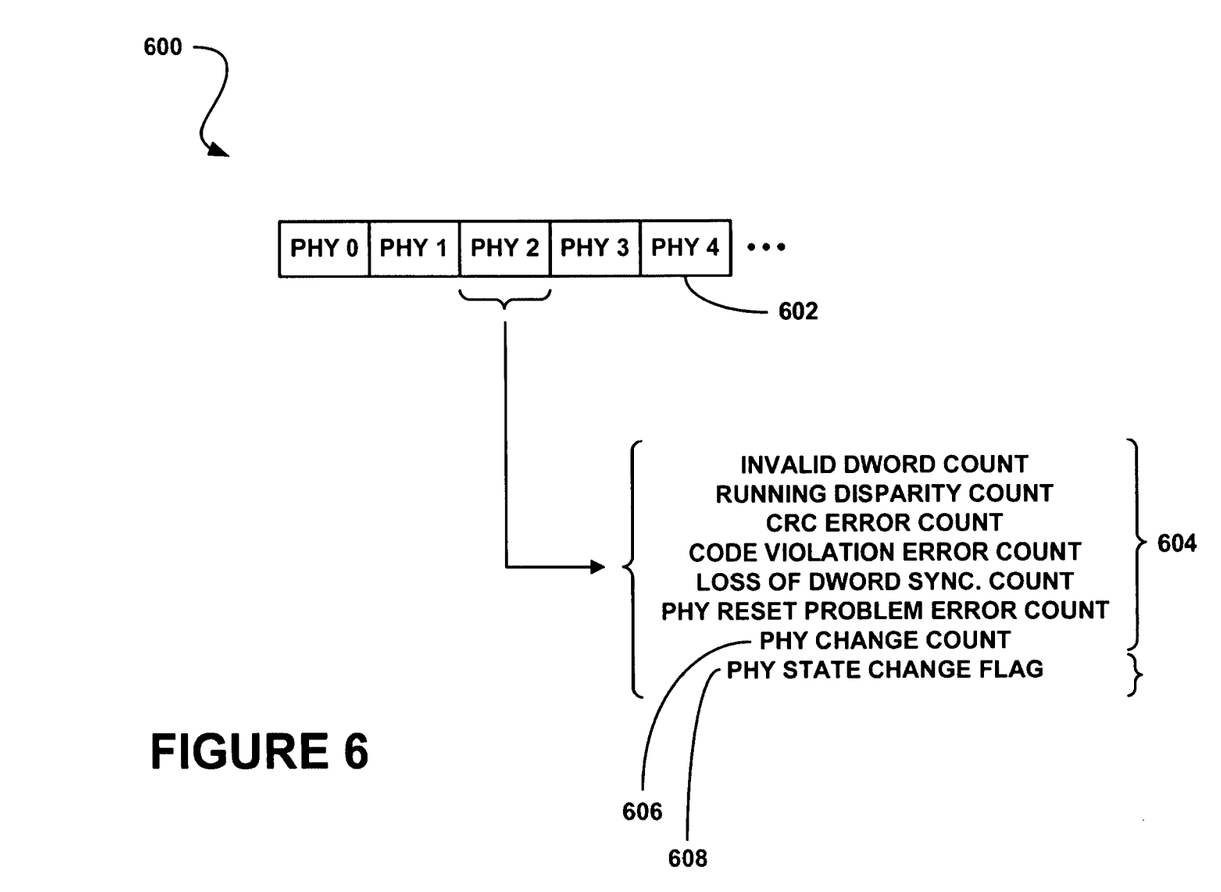
FIG. 6 illustrates a data structure for use in tracking error events and other information, in accordance with another embodiment.

FIG. 6 illustrates a data structure 600 for use in tracking error events and other information, in accordance with another embodiment. As an option, the data structure 600 may be used to track error events in connection with the method 100 of FIG. 1, and/or the sub-systems 200, 300 of FIGS. 2-3. Of course, however, it should be noted that the data structure 600 may be used in any desired environment. Again, the definitions provided above equally apply to the present description.

As shown, the data structure 600 includes arrays of error counters 602. As an option, such error counters 602 may be maintained in software. Further, an array of the error counters 602 may be maintained for each of a plurality of PHYs.

As further shown, a plurality of different counters 604 are used for counting actual error events of different types. Examples of such types may include, but are certainly not limited to an invalid DWORD count, a running disparity count, a cyclical redundancy check (CRC) count, a code violation error count, a loss of DWORD synchronization count, a physical reset problem error count, etc.

Still yet, a state change flag 608 is included which may be set, in response to a change in state (e.g. a PHY change event) occurring in a previous polling cycle. Further still, a change event counter 606 may be included for counting a number of change events (e.g. PHY change events). In use, the potential error events may be categorized as actual error events and non-error events, based on the state change flag 608 and/or the number of change events, as indicated by the change event counter 606. More information regarding one technique for using such information to dictate such categorization will now be set forth in the context of a different embodiment.

Figure 7:
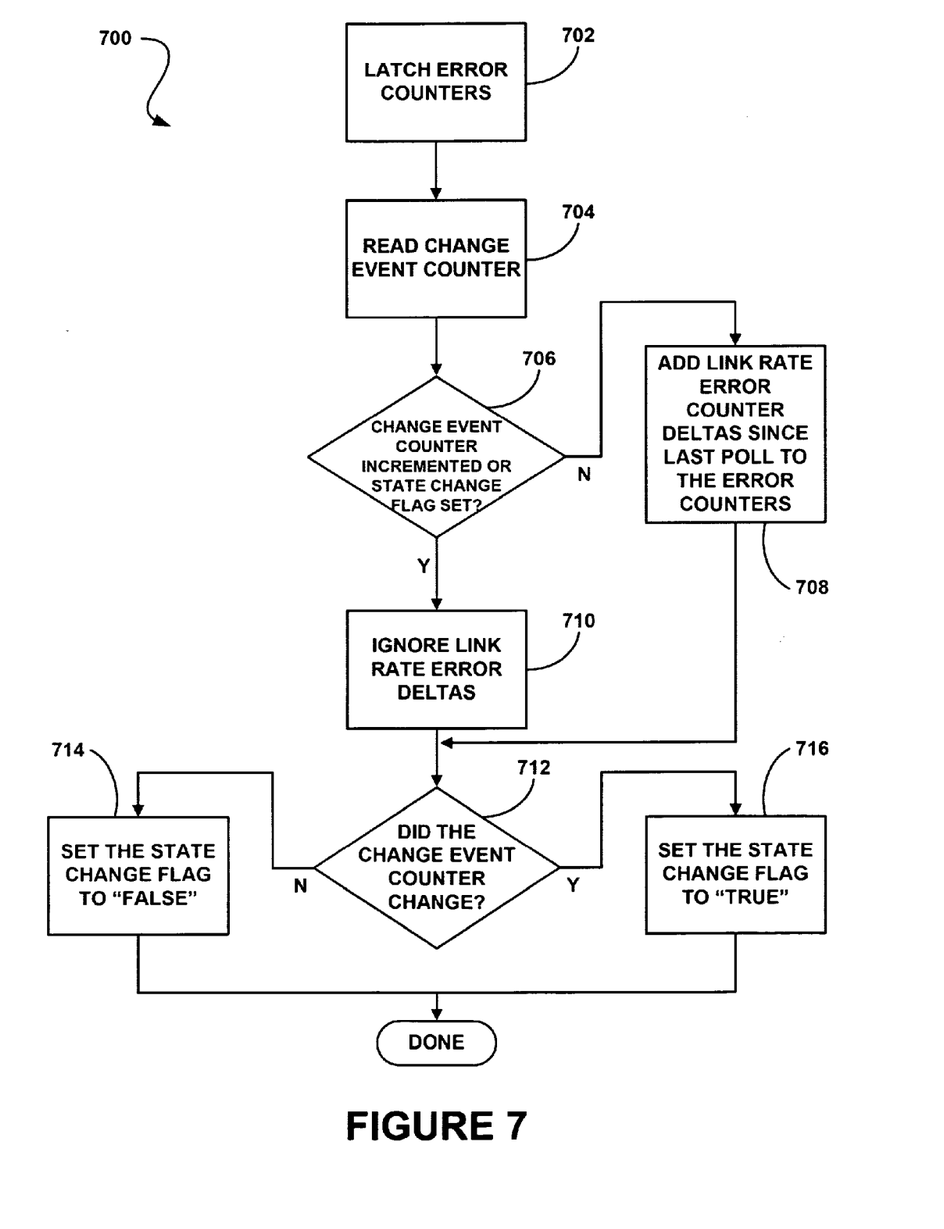
FIG. 7 illustrates a method for tracking physical layer signal state changes for the purpose of categorizing potential error events, in accordance another embodiment.

FIG. 7 illustrates a method 700 for tracking physical layer signal state changes for the purpose of categorizing potential error events, in accordance another embodiment. In one embodiment, such physical layer signal may be received by a PHY of an expander (e.g. the expanders 206, 306 of FIGS. 2-3) from a storage device (e.g. the storage devices 202, 204, 302, 304, etc.).

As an option, the method 700 may be used in the context of the framework and/or functionality of FIGS. 1-6. For example, in one embodiment, the method 700 may be implemented when polling each of a plurality of PHYs, and may be repeated for each of a plurality of polling cycles. In possible embodiment, the method 700 may be carried out by expander logic. See the logic 214, 315 of FIGS. 2-3, for example. Of course, however, it should be noted that the method 700 may be implemented in any desired environment. Yet again, the definitions provided above equally apply to the present description.

As shown, a plurality of error counters (e.g. counters 604 of FIG. 6) is latched by a current error count being fixed. See operation 702. To this end, the expander logic identifies values of the error counters that exist when operation 702 is executed.

Next, a change event counter (e.g. counter 606) is read by the expander logic, as indicated in operation 704. For reasons that will soon become apparent, any potential error events that take pace after the error counters are latched in operation 702 may be buffered for processing during a subsequent polling cycle.

It is then determined whether the change event counter has been incremented or if a state change flag (e.g. flag 608) has been set. See decision 706. Such change event counter may increment, for example, if a change event occurred during the current polling cycle. Further, the state change flag may be set if a change event occurred during a previous polling cycle, since the state change flag represents information carried over from the previous polling cycle.

If neither of the conditions set forth in decision 706 exist, it may be assumed that a change event has not occurred in a predetermined amount of time. In such case, the risk of a non-error event being mistakenly counted as an actual error event is reduced. In such case, the link rate error counter deltas since the previous polling cycle are added to the error counters. Note operation 708.

On the other hand, if the change event counter has been incremented or if the state change flag has been set, the link rate error counter deltas since the previous polling cycle may be ignored. Note operation 710. While link rate error counter deltas may be ignored in such operation, other types of errors (e.g. non-link errors, etc.) may, in some embodiments, be counted. As mentioned earlier, such non-error events may include, but are not limited to a reset event (e.g. a link reset, adapter reset, hardware reset, hardware power cycle, etc.).

It should be noted that, after the error counters are latched in operation 702, it is possible that a change event may have occurred and the change event counter incremented, before operation 704. As mentioned earlier, such change event may include a physical layer signal state change in the form of any change in a state of a physical layer signal. For example, in one embodiment, the state change on the physical layer signal may take the form of a change from ready to not ready, or vice versa.

In such case where it is possible that a change event may have occurred and the change event counter incremented, such event and any associated potential error events buffered by the expander would not necessarily have been accounted for during a current polling cycle. In various embodiments, such buffered potential error events may be buffered in a cache associated with the expander logic, in a dedicated buffer, in a portion of the data structure 600 of FIG. 6, and/or in any other desired memory, for that matter. To make sure that such buffered potential error events are addressed during a subsequent polling cycle, the state change flag of a PHY data structure (e.g. data structure 600 of FIG. 6) may be set, so as to trigger decision 706 during the subsequent cycle. To accomplish this, it may be determined by the expander logic whether the change event counter changed in decision 712. If it did, the state change flag may be set to be TRUE, as indicated in operation 716. If, however, the change event counter did not change, the state change flag may be set to be FALSE, as indicated in operation 714. By virtue of operations 712-716, the state change flag may store information useful for a next iteration of the current method 700 (e.g. during decision 706 in a subsequent polling cycle).

By this design, a size of a window in which the method 700 ignores errors within a proximity of a change event may thus be controlled by dictating a frequency in which each PHY is polled. In one embodiment, this may be accomplished by the expander logic filtering such errors. For a larger window, polling by the expander logic may be set at a slower rate. Conversely, for a smaller window, polling may be set with a higher frequency. Another embodiment is contemplated for keeping a fast polling rate, and throwing errors out for some number of polling cycles around an error event.

In one exemplary embodiment, each PHY may be polled approximately every 50 ms. This results in an effective window of approximately 100 ms around (i.e. 50 ms on either side of) a change event. In such window, errors are not counted. Of course, such window size is set forth for illustrative purposes only and should not be construed as limiting in any manner whatsoever. Further, in another possible embodiment, other signals may be used to identify actual errors, such as a loss of synchronization signal (e.g. loss of DWORD synchronization, etc.).

Using the foregoing technique, situations may be avoided where storage devices are returned, either because they are disabled based on mistaken error counts or due to mistaken error counters seen directly by the user. Such unwarranted return of storage devices for the purpose of securing service, a refund and/or a replacement, etc.; adds to a support cost of the overall product. Using the abovementioned techniques to ensure more accurate error counts, an enterprise may reduce the number of allegedly failed storage devices that are returned. In addition to lowering the support costs for the product, customer perception may also be improved. By only reporting actual error events to the customer, customer confidence in the overall system and its underlying technology may be improved.

Figure 8:
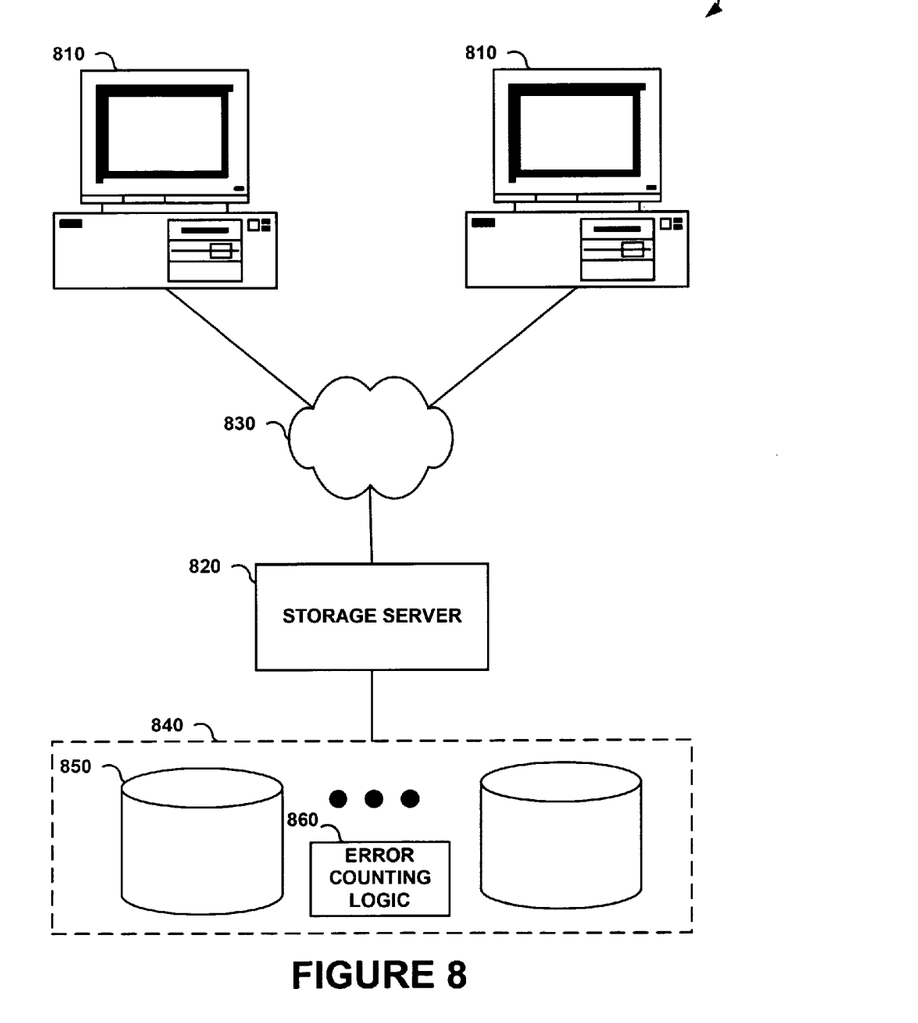
FIG. 8 is an illustration of a network environment in which an embodiment may be implemented.

FIG. 8 is an illustration of a network environment 800 in which an embodiment may be implemented. As an option, the network environment 800 may represent one possible framework with which the method 100 of FIG. 1 may be implemented. Of course, however, it should be noted that the network environment 800 may be used in any desired environment and incorporate any one or more of the features described in the previous figures.

Of course, the various embodiments described herein are not limited to any particular environment, and may be implemented in various storage processes. In the present illustration, the storage system includes a storage server 820. The storage server 820 is coupled with a storage subsystem 840, which includes a set of mass storage devices 850, and to a set of clients 810 through a network 830, such as a local area network (LAN) or other type of network. Each of the clients 810 may be, for example, a conventional personal computer (PC), workstation, or any of the other example clients set forth earlier.

The storage subsystem 840 is managed by the storage server 820. For example, the storage server 820 may receive and respond to various read and write requests from the clients 810, directed to data stored in or to be stored in the storage subsystem 840. The mass storage devices 850 in the storage subsystem 840 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

In one embodiment, the storage subsystem 840 may include one or more shelves of storage devices. For example, such shelves may each take the form of one of the subsystems shown in FIGS. 2-3. As shown, the storage subsystem 840 may further include error counting logic 860 for more accurately categorizing potential error events as actual error events, without mistakenly including non-error events in such count. While, in the present embodiment, such error counting logic 860 is shown to be a component of the storage subsystem 840 it should be noted that the it may reside elsewhere as well (e.g. exterior of the storage subsystem 840, at the storage server 820, etc.).

The storage server 820 may have a distributed architecture; for example, it may include separate N-module (network module) and D-module (data module) components (not shown). In such an embodiment, the N-module is used to communicate with the clients 810, while the D-module includes the file system functionality and is used to communicate with the storage subsystem 840. In another embodiment, the storage server 820 may have an integrated architecture, where the network and data components are all contained in a single box or unit. The storage server 820 further may be coupled through a switching fabric to other similar storage systems (not shown) that have their own local storage subsystems. In this way, all of the storage subsystems can form a single storage pool, to which any client of any of the storage systems has access.

Figure 9:
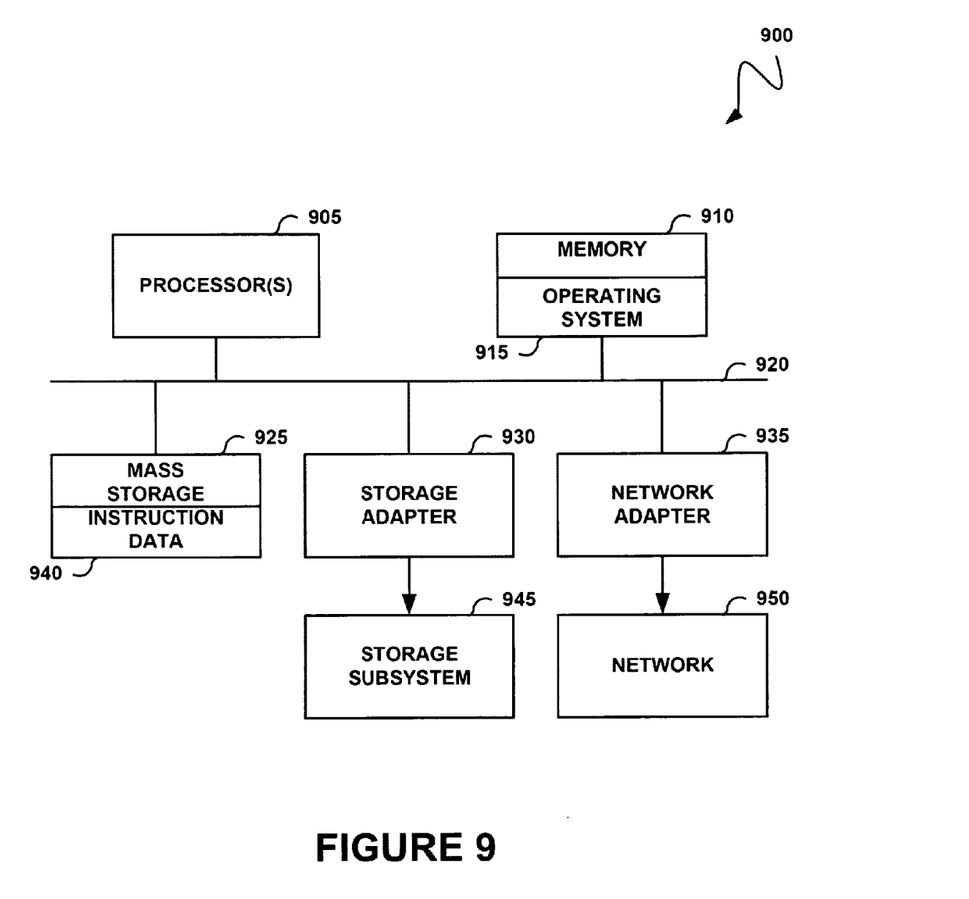
FIG. 9 is a block diagram illustrating an architecture of a storage server that may include an embodiment.

FIG. 9 is a block diagram illustrating an architecture of a storage server 900 that may include an embodiment. In one embodiment, the storage server 900 may represent the storage server 820 of FIG. 8. Of course, however, it should be noted that the storage server 900 may be implemented in any desired environment and incorporate any one or more of the features described in the previous figures.

The storage server 900 includes one or more processors 905 and memory 910 coupled to a interconnect 920. The interconnect 920 shown in FIG. 9 is an abstraction that represents any one or more separate physical buses, point-to-point connections, or both connected by appropriate bridges, adapters, or controllers. The interconnect 920, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 905 may include central processing units (CPUs) of the storage server 900 and, thus, control the overall operation of the storage server 900. In certain embodiments, the processor(s) 905 accomplish this by executing software stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 is or includes the main memory of the storage server 900. The memory 910 represents any form of random access memory (RAM), read-only memory (ROM), flash memory, or the like, or a combination of such devices. In use, the memory 910 stores, among other things, the operating system 915 of the storage server 900.

Also connected to the processor(s) 905 through the interconnect 920 may be one or more internal mass storage devices 925, a storage adapter 930 and a network adapter 935. The internal mass storage devices 925 may be or include any medium for storing large volumes of instructions and data 940 in a non-volatile manner, such as one or more magnetic or optical-based disks. The storage adapter 930 allows the storage server 900 to access a storage subsystem 945 and may be, for example, a Fibre Channel adapter or a SCSI adapter. The storage adapter 930 may interface with a D-module portion of the storage server. The network adapter 935 provides the storage server 900 with the ability to communicate with remote devices, such as clients, over a network 950 and may be, for example, an Ethernet adapter. The network adapter 935 may interface with an N-module portion of the storage server 900.

Figure 10:
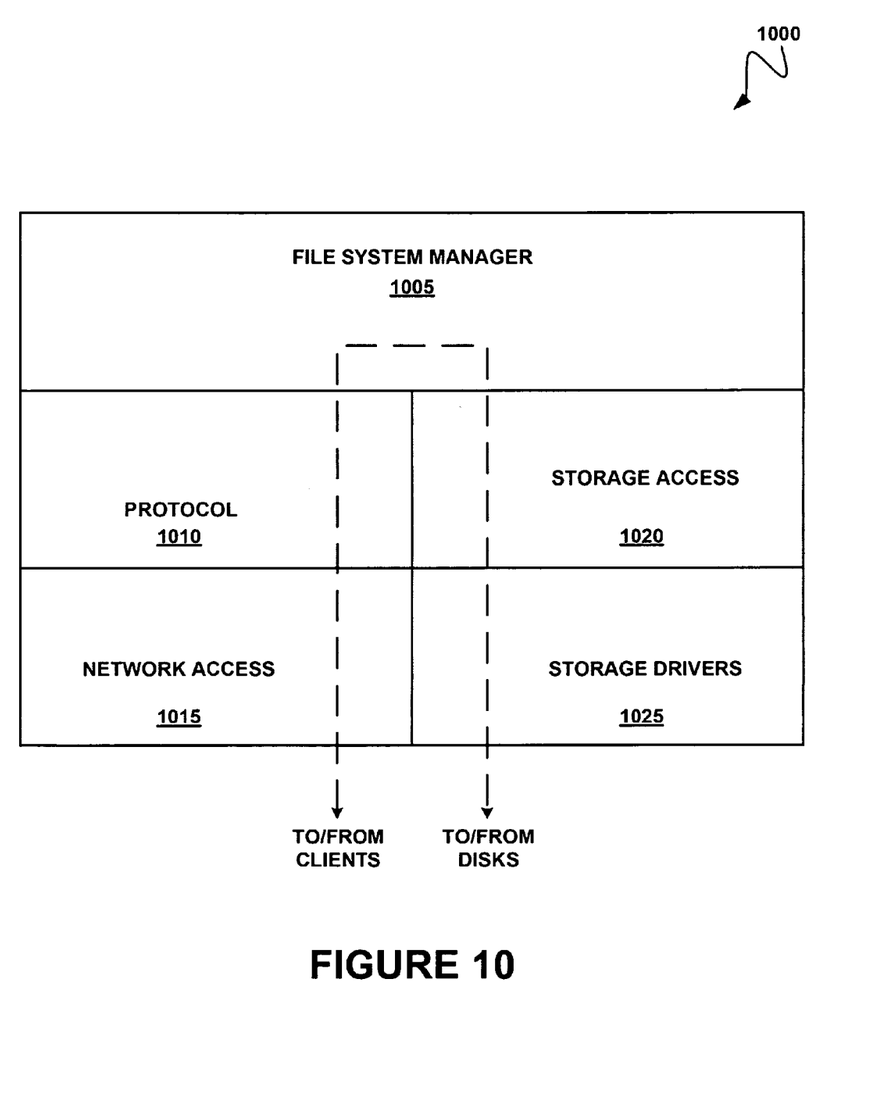
FIG. 10 illustrates an example of an operating system of a storage server according to one possible embodiment.

FIG. 10 illustrates an example of the operating system 1000 of a storage server according to one possible embodiment. As an option, the operating system 1000 may be installed on the storage server 900 of FIG. 9. Of course, however, it should be noted that the operating system 1000 may be used in any desired environment and incorporate any one or more of the features described in the previous figures.

As shown, the operating system 1000 includes several modules, or "layers." These layers include a file system manager 1005. The file system manager 1005 is software that keeps track of the directory structure (hierarchy) of the data stored in a storage subsystem and manages read/write operations on the data (i.e. executes read/write operations on the disks in response to client requests).

The operating system 1000 also includes a protocol layer 1010 and an associated network access layer 1015, to allow a storage server to communicate over a network to other systems, such as clients. The protocol layer 1010 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 1015 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 1000.

The operating system 1000 further includes a storage access layer 1020 and an associated storage driver layer 1025 to allow a storage server to communicate with a storage subsystem. The storage access layer 1020 implements a higher-level disk storage protocol, such as RAID, while the storage driver layer 1025 implements a lower-level storage device access protocol, such as Fibre Channel Protocol (FCP) or SCSI. In one embodiment, the storage access layer 1020 may implement a RAID protocol, such as RAID-4 or RAID- DP™ (RAID double parity for data protection provided by Network Appliance, Inc.), and therefore may alternatively be referred to as RAID layer 1020.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various combinations. Accordingly, other embodiments, variations, and improvements not described herein are not necessarily excluded.

What is claimed is:

1. A method for being performed by expander logic to categorize potential error events associated with a storage device as actual error events and non-error events based on a physical layer signal state change associated with the storage device, comprising:
    identifying a potential error event in association with at least one of a storage device and a link to a storage device;
    identifying a physical layer signal state change in association with the at least one of the storage device and the link to the storage device;
    determining if the potential error event occurred within a predetermined time of the physical layer signal state change for categorizing the potential error event as an actual error event or a non-error event, the predetermined time being stored in memory;
    if it is determined that the potential error event occurred within the predetermined time of the physical layer signal state change, categorizing the potential error event as the non-error event;
    if it is determined that the potential error event did not occur within the predetermined time of the physical layer signal state change, categorizing the potential error event as the actual error event; and
    outputting a result of the categorization;
    wherein determining if the potential error event occurred within the predetermined time of the physical layer signal state change includes comparing a first timestamp associated with the potential error event and a second timestamp associated with the physical layer signal state change, for determining a difference, and further comparing the difference to the predetermined time.

2. The method of claim 1, wherein the predetermined time selected based on heuristics indicating a time period that avoids counting non-error events as error events.

3. The method of claim 1, wherein the physical layer signal state change involves a PHY change event.

4. The method of claim 1, wherein the physical layer signal state change indicates whether a PHY is ready.

5. The method of claim 1, and further comprising filtering the non-error event to avoid categorizing the non-error event as an actual error event.

6. The method of claim 1, wherein only a plurality of the actual error events is counted.

7. The method of claim 1, wherein the result includes a tally of a plurality of the actual error events.

8. The method of claim 1, wherein a plurality of different counters are used for counting actual error events of different types.

9. The method of claim 1, and further comprising setting a state change flag in response to a change event occurring in a previous polling cycle, wherein the potential error event is further categorized based on the state change flag.

10. The method of claim 1, and further comprising counting a number of change events, wherein the potential error event is further categorized based on the number of change events.

11. A method for being performed by expander logic to categorize potential error events associated with a storage device as actual error events and non-error events based on a state change associated with the storage device, comprising:
    identifying potential error events in association with at least one of a storage device and a link to a storage device;
    identifying a state change in association with the at least one of the storage device and the link to the storage device;
    determining if the potential error events occurred within a predetermined time of the state change for categorizing the potential error event as an actual error event or a non-error event, the predetermined time being stored in memory;
    if it is determined that the potential error events occurred within the predetermined time of the state change, categorizing the potential error events as non-error events;
    if it is determined that the potential error events did not occur within the predetermined time of the state change, categorizing the potential error events as actual error events;
    counting only the actual error events, thereby excluding the non-error events from a resulting error count; and
    outputting a result based on the error count
    wherein determining if the potential error events occurred within the predetermined time of the state change includes comparing a first timestamp associated with each of the potential error events and a second timestamp associated with the state change, for determining a difference, and further comparing the difference to the predetermined time.

12. The method of claim 11, wherein the state change includes a physical layer signal state change.

13. The method of claim 11, wherein the state change includes a loss of synchronization signal.

14. A system, comprising:
    a storage device;
    an expander coupled to the storage device via a link, the expander including logic for identifying potential error events in association with at least one of the storage device and the link to determine if the potential error events occurred within a predetermined time of a physical layer signal state change, the predetermined time being stored in memory, wherein, if it is determined that the potential error events occurred within the predetermined time of the physical layer signal state change, the logic categorizes the potential error events as non-error events; and if it is determined that the potential error events did not occur within the predetermined time of the physical layer signal state change, the logic categorizes the potential error events as actual error events; and
    a counter in communication with the expander, the counter stored for counting only the actual error events, thereby excluding the non-error events from a resulting error count;
    wherein determining if the potential error events occurred within the predetermined time of the physical layer signal state change includes comparing a first timestamp associated with each of the potential error events and a second timestamp associated with the physical layer signal state change, for determining a difference, and further comparing the difference to the predetermined time.

15. The system of claim 14, wherein the physical layer signal state change involves a PHY change event.

16. The system of claim 14, wherein the physical layer signal state change indicates whether a PHY is ready.

17. The system of claim 14, wherein the non-error event is filtered to avoid categorizing the non-error event as an actual error event.

18. The system of claim 14, wherein only a plurality of the actual error events is counted.

19. The system of claim 14, wherein the result includes a tally of a plurality of the actual error events.

20. The system of claim 14, wherein a plurality of different counters are used for counting actual error events of different types.

* * * * *